United States Patent [19]

Chirinos et al.

[11] Patent Number: 5,670,087
[45] Date of Patent: Sep. 23, 1997

[54] METHOD OF PREPARING HIPR BITUMINOUS EMULSIONS

[75] Inventors: Maria Luisa Chirinos, Caracas, Venezuela; Alistair Stewart Taylor, Yateley; Spencer Edwin Taylor, Camberley, both of United Kingdom

[73] Assignee: Intevep, S.A., Caracas, Venezuela

[21] Appl. No.: 474,253

[22] Filed: Jun. 7, 1995

Related U.S. Application Data

[63] Continuation of Ser. No. 217,221, Mar. 24, 1994, abandoned, which is a continuation of Ser. No. 53,299, Apr. 23, 1993, abandoned, which is a continuation of Ser. No. 561,264, Jul. 2, 1990, abandoned, which is a continuation of Ser. No. 266,259, Nov. 2, 1988, abandoned, which is a continuation of Ser. No. 147,022, Jan. 19, 1988, abandoned, which is a continuation of Ser. No. 726,666, Apr. 24, 1985, abandoned.

[51] Int. Cl.$^6$ .............................. B01J 13/00; C08L 95/00
[52] U.S. Cl. ................... 252/311.5; 106/277; 106/284.4; 252/314
[58] Field of Search ................... 252/311.5, 314; 106/277, 284.4

[56] References Cited

U.S. PATENT DOCUMENTS

| | | | |
|---|---|---|---|
| 2,009,821 | 7/1935 | Terrey et al. | 252/311.5 |
| 4,007,127 | 2/1977 | Smadja et al. | 252/311.5 |
| 4,104,211 | 8/1978 | Keene et al. | 524/60 |
| 4,293,459 | 10/1981 | Detroit | 106/277 |
| 4,450,011 | 5/1984 | Schilling et al. | 106/273 N |
| 4,523,957 | 6/1985 | Graf et al. | 106/277 |
| 4,776,977 | 10/1988 | Taylor | 252/314 |
| 4,934,398 | 6/1990 | Chirinos et al. | 252/314 X |

FOREIGN PATENT DOCUMENTS

| | | |
|---|---|---|
| 1132908 | 10/1982 | Canada. |
| 48-55201 | 8/1973 | Japan. |
| 51-25534 | 3/1976 | Japan. |
| 362577 | 12/1931 | United Kingdom. |

OTHER PUBLICATIONS

*Emulsions and Emulsion Technology*, Part I, Edited by Kenneth J. Lissant, Marcel Dekker, Inc., New York (1974) Pages "Contents", 6–9, 48–69, 102–125, 402–408, 434 & 435.

Primary Examiner—Richard D. Lovering
Attorney, Agent, or Firm—Bachman & LaPointe, P.C.

[57] ABSTRACT

An HIPR emulsion of bitumen in water is prepared by a method which comprises directly mixing 70 to 98% by volume of bitumen having a viscosity in the range 200 to 500,000 mPa.s at the mixing temperature with 30 to 2% by volume of an aqueous solution of an emulsifying surfactant, percentages being expressed as percentages by volume of the total mixture. Mixing is effected under low shear conditions in the range 10 to 1,000 reciprocal seconds in such manner that an emulsion is formed comprising highly distorted bitumen droplets having mean droplet diameters in the range 2 to 50 micron separated by thin films of water.

The emulsions can be cut back to provide stable emulsions of lower bitumen content which are useful in road-making and the formation of protective coatings.

8 Claims, No Drawings

METHOD OF PREPARING HIPR BITUMINOUS EMULSIONS

RELATED APPLICATION

The instant application is a continuation of U.S. patent application Ser. No. 08/217,221 filed Mar. 24, 1994 and now abandoned; which is a continuation of U.S. patent application Ser. No. 08/053,299 filed Apr. 23, 1993 and now abandoned; which is a continuation of U.S. patent application Ser. No. 07/561,264 filed Jul. 2, 1990 and now abandoned; which is a continuation of U.S. patent application Ser. No. 07/266,259 filed Nov. 2, 1988 and now abandoned; which is a continuation of U.S. patent application Ser. No. 07/147,022 filed Jan. 19, 1988 and now abandoned; which is a continuation of U.S. patent application Ser. No. 06/726,666 filed Apr. 24, 1985 and now abandoned.

BACKGROUND OF THE INVENTION

This invention relates to a method for the preparation of emulsions of bitumen in water and more particularly the preparation of high internal phase ratio (HIPR) emulsions of bitumen in water.

Bitumen is a highly viscous material which is useful in roadmaking and for other purposes. Because of its high viscosity it is difficult to use in the cold or in an untreated condition. One method of reducing the viscosity is by heating the material and using it hot. Another is by adding a light petroleum distillate as a diluent. This will thin the bitumen and allow its application at lower temperature. However, the distillate will subsequently be lost by evaporation and may give rise to environmental problems. A third, with which the present invention is concerned, is by forming an emulsion of bitumen in water. Emulsions have lower viscosities than the starting bitumen and can be used at lower temperatures for spraying or mixing purposes.

However, the dispersion of bitumen in a medium of much lower viscosity such as water is an unfavorable process on hydrodynamic grounds. This problem is further complicated by the desirability in certain applications to utilize emulsions containing relatively high bitumen phase volumes without sacrificing emulsion fluidity.

In the case of a system comprising dispersed spheres of equal size, the maximum internal phase volume occupied by a hexagonally close-packed arrangement is ca 74%. In practice, however, emulsions are rarely monodisperse and it is therefore possible to increase the packing density slightly beyond 74% without causing appreciable droplet distortion. Attempts to increase further the internal phase volume beyond this second level results in greater droplet deformation and, because of the larger interfacial area created, instability arises; this culminates in either phase inversion or emulsion breaking. Under exceptional circumstances, it is possible to create dispersions containing as high as 98% disperse phase volume without inversion or breaking.

Emulsified systems containing >70% internal phase are known as HIPR emulsions. HIPR emulsions are normally prepared by dispersing increasing amounts of the dispersed phase into the continuous phase until the internal phase volume exceeds 70%. Clearly, for very high internal phase volumes, e.g. above 80%, the systems cannot contain discrete spherical dispersed phase droplets; rather, they will consist of highly distorted droplets, separated by thin aqueous films.

A useful state-of-the art review of HIPR emulsion technology is given in Canadian Patent No. 1,132,908.

We have discovered an improved method for the preparation of HIPR bitumen emulsions in which the emulsions are directly prepared from a feedstock initially containing a high volume ratio of bitumen to water using low energy mixing as opposed to high energy dispensing.

According to the present invention there is provided a method for the preparation of an HIPR emulsion of bitumen in water which method comprises directly mixing 70 to 98%, preferably 80 to 95%, by weight of bitumen having a viscosity in the range 200 to 500,000, preferably 1000 to 250,000, mPa.s at the mixing temperature with 30 to 2%, preferably 20 to 5%, by weight of an aqueous solution of an emulsifying surfactant, percentages being expressed as percentages by weight of the total mixture; mixing being effected under low shear conditions in the range 10 to 1,000, preferably 50 to 250, reciprocal seconds in such manner than an emulsion is formed comprising distorted bitumen droplets having mean droplet diameters in the range 2 to 50 micron separated by thin films of water.

In order to provide bitumen having the appropriate characteristics it will usually be necessary to heat it to a temperature not exceeding 100° C.

Nevertheless, this temperature is significantly lower than that to which bitumen is generally heated in the manufacture of conventional bitumen emulsions. Current methods for producing bitumen emulsions with a cationic surfactant involve emulsification at a temperature in the range 120° to 140° C. and under high shear conditions (e.g. in a colloid mill) in order to attain the required droplet size. High shear mechanical dispersing can lead to the formation of polydisperse emulsions having some relatively large size particles or multiple emulsions, both of which are undesirable features.

Hard bitumens which could not be emulsified by conventional methods are suitable for emulsification by the present method. Such bitumens could be treated only with difficulty in the past because of the excessively high temperatures required to reduce the viscosity of the bitumen to a level at which it could be worked.

The bitumen and water may be mixed using equipment known to be suitable for mixing viscous fluids, see HF Irving and RL Saxton, Mixing Theory and Practice (Eds. VW Uhl and JB Gray), vol. 1, Chapter 8, Academic Press, 1966. In addition to the equipment described above, static mixers may also be used.

Suitably the surfactant is employed in amount 0.1 to 5% by weight, based on the total weight of the emulsion.

Suitable surfactants include anionic surfactants, mixtures of anionic and non-ionic surfactants, cationic surfactants (which are preferred) and mixtures of cationic and non-ionic surfactants.

Non-ionic surfactants include ethoxylated alkyl phenols, ethoxylated alcohols and ethoxylated sorbitan esters.

Cationic surfactants include the hydrochlorides of fatty diamines, imidazolines, ethoxylated amines, amidoamines and quaternary ammonium compounds.

Anionic surfactants include long chain carboxylic and sulphonic acids.

By the method of the present invention it is possible to prepare HIPR emulsions having higher contents of bitumen than those previously disclosed.

Thus according to a further feature of the present invention there is provided an HIPR emulsion of bitumen in water containing 80 to 98%, preferably 85 to 95%, by weight of bitumen, the emulsion comprising distorted bitumen droplets having a mean particle diameter in the range 2 to 50 micron.

The HIPR emulsions as prepared are stable and can be diluted with aqueous surfactant solution or water to produce stable emulsions of lower bitumen phase volume showing high degrees of monodispersity. The emulsions may be diluted to a required viscosity without adversely affecting stability. Because the narrow size distribution is maintained upon dilution the resulting emulsion shows little tendency to creaming. This in turn reduces the risk of phase separation.

The emulsions, particularly the diluted emulsions when diluted with a surfactant solution, are suitable for use inter alia in road making and maintenance and paper coatings and metal coatings.

The invention is illustrated with reference to the following Examples.

EXAMPLE 1

A 90% HIPR emulsion was prepared by adding a 90 g sample of 200 pen grade Cyrus bitumen to a 250 ml beaker containing 10 g of 3.0% aqueous non-ionic surfactant solution. The surfactant was an alkyl aromatic ethoxylate. This was then mixed at 90° C. using a twin-beater hand-held domestic mixer operating for one minute at 1000 rpm followed by a further one minute period at 1200 rpm under low shear conditions (a few hundred reciprocal seconds).

During the mixing process, films of aqueous surfactant are stretched out and folded throughout the bitumen, ultimately leading to a complex film structure.

Dilution of the HIPR emulsion with additional water releases the bitumen from its constraining framework and spherical droplets separate.

Subsequent dilution of this 90% bitumen emulsion with 1% surfactant solution at 90° C. enabled the formation of emulsions of lower bitumen contents; i.e. 70/30, 60/40 and 50/50. After 18 months storage at room temperature, these diluted emulsions showed no signs of coalescence.

Although the viscosity of the emulsions increased with increasing bitumen content, it was evident that even at room temperature, the 70% bitumen emulsion still exhibited a reasonable degree of fluidity and would therefore be suitable for pumping. Further dilution permitted microscopic examination of the emulsions and revealed a good degree of monodispersity and a mean droplet diameter of approximately 15 microns.

EXAMPLES 2-7

Further emulsions of bitumen in water were prepared by the following technique:

0.8g of the hydrochloride of that fatty amine sold under the trade name Dinoram-S was placed in a 500 ml beaker, water (27 ml) added and then the solution warmed to 40°–50° C. to dissolve the surfactant. Bitumen was heated to 90° C. and 240 g added to the aqueous phase. The beaker containing the bitumen and aqueous phase was placed in a water bath at 90° C. for 5 minutes. The bitumen and aqueous phase were then mixed for 30 seconds using a domestic mixer to give a 90% emulsion. An aqueous solution (76.5 ml) containing 1% by weight emulsifier was then added over a period of 30 seconds with mixing to dilute the emulsion to a lower bitumen content. Following dilution, mixing was continued for a further 60 seconds to ensure a thoroughly homogenized product.

The storage stability of the emulsions was assessed by a subjective procedure comprising a visual examination of the emulsions after 1, 5, 24 and 48 hours. Signs of instability were indicated by skin formation and agglomeration which gave a granular appearance with a resulting reduction in viscosity.

The results set out in the following Table 1 were obtained.

TABLE 1

| Example | Bitumen Penetration Grade | Viscosity at 90° C. (mPa · s) | Temperature of Mixing (°C.) | Bitumen Content of Emulsion (% wt) | Surfactant Content Total Emulsion (% wt) | Stability (Hours) | Mean Particle Size Diameter (μ) |
|---|---|---|---|---|---|---|---|
| 2 | Cyrus 200 pen | 4,300 | 90 | 70 | 0.52 | >48 | 8.1 |
| 3 | Kuwait 200 pen | 3,600 | 90 | 70 | 0.52 | >48 | 9.5 |
| 4 | | | | 80 | 0.34 | >48 | 7.7 |
| 5 | Kuwait 100 pen | 5,800 | 90 | 70 | .52 | >48 | — |
| 6 | | | | 80 | .52 | >48 | 7.2 |
| 7 | Kuwait 70 pen | 10,000 | 90 | 70 | 0.52 | >48 | 11.0 |

EXAMPLES 8-10

Similar procedures were employed to prepare emulsions from three bitumens derived from the atmospheric distillation of two Venezuelan crude oils.

The surfactants used were as follows:

Example 8–a blend of sodium oleate and a nonyl phenol ethoxylate.

Example 9–that sold under the trade name Pouanida B.

Example 10–the hydrochloride of that sold under the trade name Duomeen T.

The results set out in the following Table 2 were obtained.

TABLE 2

| Example | Bitumen Source | Penetration | Temperature of Mixing (°C.) | Bitumen Content of Emulsion (% wt) | Stability (Hours) | Mean Particle Size Diameter (μ) |
|---|---|---|---|---|---|---|
| 8 | Morichal | 200 | 70 | 75 | >48 | 9.8 |
| 9 | Morichal | 65 | 92 | 80 | >48 | 7 |
| 10 | Cerro Negro | 92 | 90 | 90 | >48 | 4 |

We claim:

1. A method for the preparation of a high internal phase ratio emulsion having a high degree of monodispersity of bitumen in water, the method consisting essentially of directly mixing 70 to 98% by weight of bitumen with 30 to 2% by weight of an aqueous solution of an emulsifying surfactant, percentages being expressed as percentages by weight of the total mixture; the bitumen having a viscosity in the range 200 to 500,000 mPas at the mixing temperature and mixing being effected under low shear conditions in the range 10 to 1,000 reciprocal seconds throughout the entire mixing operation in such manner that an emulsion is formed comprising distorted bitumen droplets having a high degree of monodispersity with a mean droplet diameter in the range 2 to 50 microns separated by thin films of water.

2. A method for the preparation of a high internal phase ratio emulsion having a high degree of monodispersity of bitumen in water, the method consisting essentially of directly mixing 70 to 98% by weight of bitumen with 30 to 2% by weight of an aqueous solution of an emulsifying surfactant, percentages being expressed as percentages by weight of the total mixture; the bitumen having a viscosity in the range 1,000 to 250,000 mPas at the mixing temperature and mixing being effected under low shear conditions in the range 10 to 1,000 reciprocal seconds throughout the entire mixing operation in such manner that an emulsion is formed comprising distorted bitumen droplets having a high degree of monodispersity with a mean droplet diameter in the range 2 to 50 microns separated by thin films of water.

3. A method according to claim 2 wherein the feedstock comprises 80% to 95% by weight of bitumen, expressed as a percentage by weight of the total mixture.

4. A method according to claim 2 wherein mixing is effected under low shear conditions in the range 50 to 250 reciprocal seconds.

5. A method according to claim 2 wherein the surfactant is a mixed anionic/non-anionic surfactant.

6. A method according to claim 2 wherein the surfactant is a cationic surfactant.

7. A method for the production of an emulsion of bitumen in water characterized by the fact that an HIPR emulsion of bitumen in water is prepared by a method according to claim 2 and subsequently diluted with an aqueous solution of a surfactant.

8. A method for the preparation of a high internal phase ratio emulsion having a high degree of monodispersity of bitumen in water, the method consisting essentially of directly mixing 70 to 98% by weight of bitumen with 30 to 2% by weight of an aqueous solution of an emulsifying surfactant, percentages being expressed as percentages by weight of the total mixture; the bitumen having a viscosity in the range 200 to 500,000 mPas at the mixing temperature and mixing being effected under low shear conditions in the range 50 to 250 reciprocal seconds throughout the entire mixing operation in such manner that an emulsion is formed comprising distorted bitumen droplets having a high degree of monodispersity with a mean droplet diameter in the range 2 to 50 micron separated by thin films of water.

* * * * *